W. S. WESTON.
AUTOMATIC MAXIMUM SPEED CONTROLLER.
APPLICATION FILED SEPT. 20, 1916.

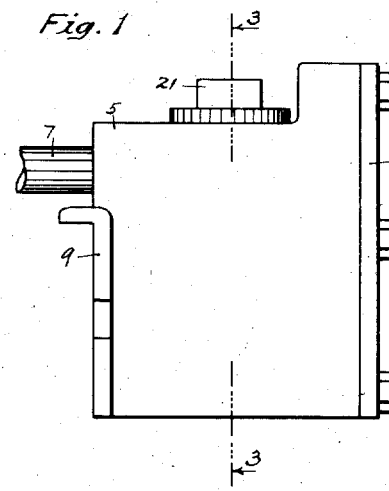
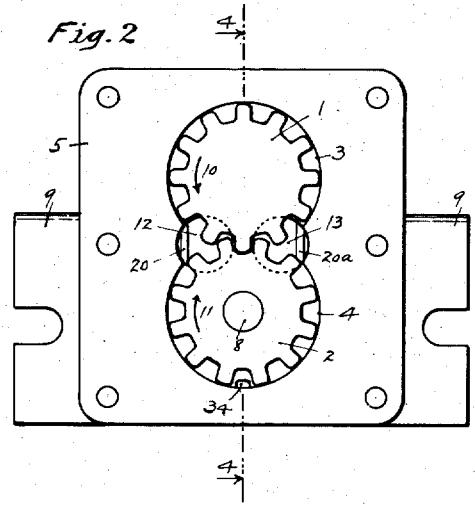
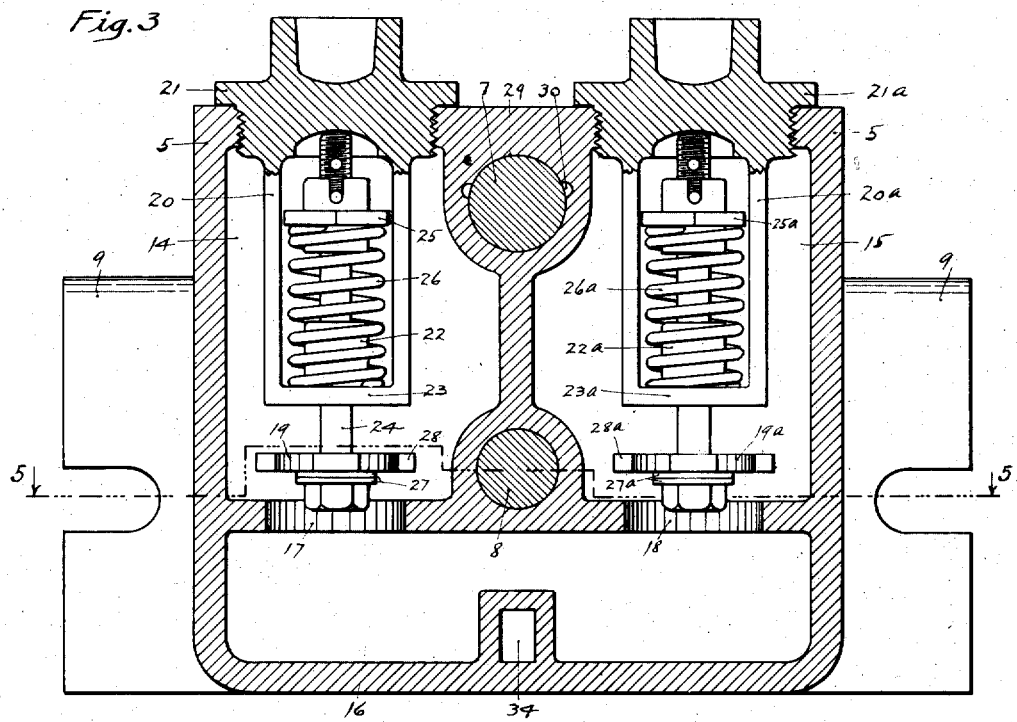

1,257,565.

Patented Feb. 26, 1918.
2 SHEETS—SHEET 2.

Witnesses:—
J. G. Anderson
D. M. Hagenow

Inventor:—
William S. Weston
By Peirce, Fisher & Clapp
Attys.

UNITED STATES PATENT OFFICE.

WILLIAM S. WESTON, OF HOUSTON HEIGHTS, TEXAS.

AUTOMATIC MAXIMUM-SPEED CONTROLLER.

1,257,565.    Specification of Letters Patent.    Patented Feb. 26, 1918.

Application filed September 20, 1916. Serial No. 121,176.

*To all whom it may concern:*

Be it known that I, WILLIAM S. WESTON, a citizen of the United States, residing in the city of Houston Heights, county of Harris, and State of Texas, have invented certain new and useful Improvements in Automatic Maximum-Speed Controllers for Power-Driven Vehicles or other Machines, of which the following is a full, clear, and exact description.

My invention relates to improvements in the construction and adaptation of a gear pump to the purpose of a liquid or hydraulic brake whereby the excess power delivered by the prime mover, or the excess kinetic energy stored in the moving vehicle is absorbed in driving the pump.

The object of my invention is to provide a simple, practical, and reliable mechanism, of the type specified, equipped to limit automatically the speed at which motor-vehicles or other machines may be run.

In the attainment of this object I have used a plain type of gear pump with the ordinary incased intermeshing toothed gears, and have closed the compression and suction chambers to the exterior, but have connected them together by an interior passage. For this passage I have provided an improved automatically actuated valve, governed by the speed of operation, and adapted to throttle the flow of liquid returning from the compression to the suction chamber. I have also provided improved means for maintaining a high working level of liquid in the compression and suction chambers and for returning the liquid leaking out through the driving shaft bearing.

The embodiment of these improvements in the construction and operation of a complete device is hereinafter fully described and clearly illustrated in the accompanying drawings which form a part of these specifications, and the elements of novelty are particularly pointed out in the claims.

Figure 4:
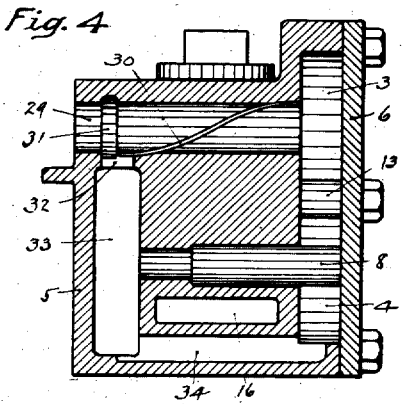
Figure 5:
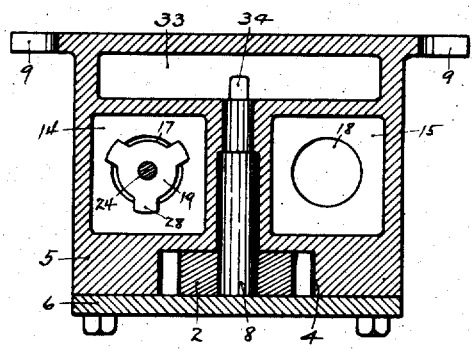
Figure 6:
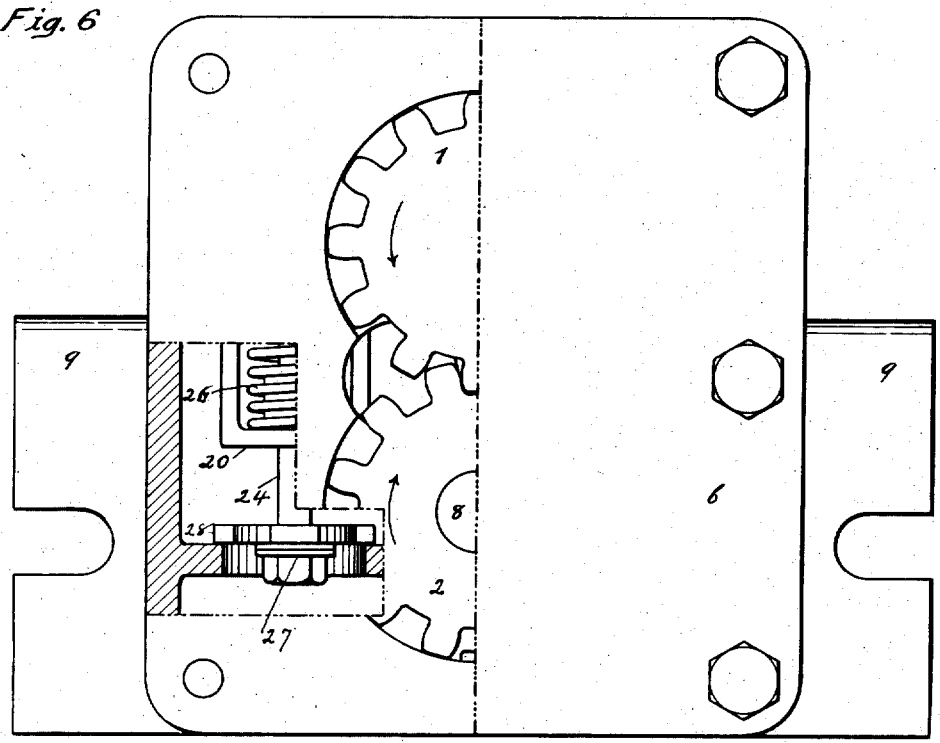

Figure 1 is a side elevation of the device. Fig. 2 is a front elevation with the cover plate removed. Fig. 3 is an enlarged vertical section on the center line of the valves on the line 3—3 of Fig. 1, showing the arrangement of duplicate valves for operation forward or backward. Fig. 4 is a vertical section on the center line of the axes of the gears on the line 4—4 of Fig. 2, leaving out the gears. Fig. 5 is a horizontal section on the line 5—5 of Fig. 3. Fig. 6 is a front elevation, on the same scale as Fig. 3, with half of the cover plate removed, and with part of the secondary gear and the casing back of it cut away to show a valve in the minimum closed position.

The same numerals used as characters of designation represent the same parts in the several views.

The device in its simplest form is constructed with only two pumping gears which, for convenience of description, I will hereinafter refer to as primary and secondary gears. The primary gear is rotated by a direct connection with the external source of driving power, while the secondary gear is rotated only through its intermeshing relation with the primary. Referring to Figs. 1 and 2, the primary gear, 1, and the secondary gear 2, are set in and closely incased in concentric recesses, 3 and 4, in the face of the main casting 5 and are covered by the plate 6. The primary gear, 1, is attached to and preferably made integral with a shaft, 7, extending through the casting, 5, for a connection for synchronous operation by or with the running mechanism of the machine on which it is mounted. The secondary gear, 2, is mounted idle on a pin 8. The main casting 5, is provided with brackets, 9, whereby it may be firmly attached to the frame of the machine. The exact method of mounting the device and the detail of the construction for connecting the shaft, 7, for synchronous running will be modified to suit the construction of any motor-vehicle or machine; but, not being elements in this invention and not essential to its description, they are not further illustrated or described.

In some applications of the device such as to railway motor cars the primary gear may be run either clockwise or counter-clockwise according to whether the car is running forward or backward. Some types of gasolene motor cars are equipped to run equally well either way. In consequence my speed controlling device is made symmetrical, preferably, with double parts where necessary, although the elements essential to an operative device are only those required for operation in one direction.

With the primary gear, 1, run counter-clockwise as indicated by the arrow, 10, Fig.

2, the secondary gear, 2, will be run clockwise, as indicated by the arrow, 11. The gears are mounted to mesh and run freely in their recesses, 3 and 4, and yet sufficiently close to be practically fluid or liquid tight, with only a small percentage of leak, at the lines of intermeshing contact and around the outer periphery of the teeth. The rotation in the direction indicated brings any liquid in the interdental spaces around to a space, 12, on one side of the gears where the teeth begin to intermesh and takes away any liquid from the opposite space, 13, where the teeth unmesh. The region of space 12 is the compression or discharge side, and the region of space 13 is the suction side of the gear pump portion of the device.

In the preferred form of my invention the discharge side and the suction side have no exterior connection, but are connected together by an interior passage or series of chambers. Referring to Figs. 2 and 3, the discharge space 12 is enlarged to form a circular opening, shown in dotted outline, leading into a chamber 14, called the compression chamber, and the suction space 13 is enlarged to form a circular opening leading from a chamber, 15, called the suction chamber. Beneath chambers 14 and 15 is a third chamber, 16, connected to each, respectively, by ports 17 and 18. With the pump running as indicated the flow of liquid would be from the discharge side through opening 12, chamber 14, port 17, chamber 16, port 18, chamber 15, and opening 13 back to the suction side. With the openings and ports large enough to permit an easy and unconstricted flow of liquid the pump may be run at a high rate of speed without the absorption of much power.

A fundamental element of my invention is the provision of means for rapidly but not completely closing one of the ports between the compression and suction chambers after the speed of the pump and the car on which it is mounted has reached a predetermined maximum rate, thereby absorbing in the pump the power that otherwise would go into holding the speed of the car at a higher rate. With the pump running as indicated I provide a valve, 19, for the port 17 of the chamber 14. The entire valve mechanism made up as a unit consists of a rectangular yoke or frame, 20, carried by a cap 21, screwed into and seated in the top of the chamber 14; a guide sleeve, 22, on the cross bar, 23, of the frame; a bolt, 24, carrying the valve 19, passing through the cross bar and sleeve and having an adjusting nut, 25, within the frame; a compression spring 26, within the frame, surrounding the sleeve, bearing between the cross bar and the nut and adapted to hold the threaded end of the bolt in normal position against the cap 21; and adjusting washers, 27, for regulating the position of the valve as supported on the head of the bolt. The proportions are such when the cap is screwed down to its seat that the valve will be held in its normal position, as shown in Fig. 3, some distance above the port, leaving an opening sufficient to allow a moderately unconstricted flow of liquid while the pump is running at less than the maximum rate. When the valve is drawn down against the spring action this opening is reduced, but the port is never entirely closed. In the form illustrated the valve is a disk somewhat smaller in diameter than the port and is provided with three or more lugs, 28, adapted to come to rest on the edge of the port. The reduced area of the opening appears as segments of rings, as seen in Fig. 5.

In operation as the speed of the pump approaches the maximum the volume and velocity of the liquid passing through the port becomes greater than the capacity of the opening for a normal easy flow and begins to establish a back pressure or hydraulic head in the chamber 14, which then becomes in a true sense a compression chamber. This compression reacts on the upper surface of the valve to press it down toward the port against the resistance of the spring and thereby reduces the opening. If the speed of the pump does not slacken, the reduction in the valve opening causes a further increase of hydraulic pressure and a still further reduction of valve opening. This correlated and simultaneous action goes on, dependent on the increasing resistance of the spring, until the valve closes the port the utmost amount its shape will permit. If the pump continues to run at or near the maximum speed with the valve closed up as shown a very considerable amount of power will be absorbed in pumping the large volume of liquid through the greatly reduced opening. With the parts of the entire mechanism suitably proportioned to each other and to the power of the prime mover this absorption of power will operate to reduce the speed of the pump and the car with which it is running. A reduction in speed reduces the volume of liquid pumped thereby reducing the hydraulic pressure in the compression chamber and allowing the valve to begin to open under the action of the spring. The correlation between the compression and the valve movement, now working with a decreasing pressure, allows the spring to return the valve to its full open position with the end of the bolt bearing against the cap. The proportions of the spring and its initial tension in the normal open position are preferably made so that a slight increase in the speed of the pump is necessary after the valve begins to close in order to start the correlated action which will bring it to its minimum closed position. It will be understood readily that the valve should never be constructed to close the port entirely, as if it did a dead lock would be established bringing the pump and car to a full stop and subjecting the entire mechanism to disrupting strains.

It is desirable that the valve mechanism should be made either adjustable for the different maximum speeds that may be required, or else manufactured for the different speeds and made interchangeable. In some uses of the speed controlling mechanism such as on railway motor section gang cars that may be allowed to race on down grades under the action of gravity and that may frequently be run by unauthorized or irresponsible operators it is a matter of safety economics to automatically limit the speed of the car to a definite maximum of miles per hour. Preferably for such use the valve mechanism will be permanently adjusted in its manufacture. For the purposes of this description it will be sufficient to note the two primary features in the adjustment. First, the area of opening between the valve and the port, being suitably proportioned to the size of the pump, can be varied for the open or normal position. Second, the spring can be varied in size and initial tension. Local adjustments in the mechanism as illustrated can be made by removing or adding washers 27 to vary the opening and by manipulating the nut 25 to vary the initial tension.

The foregoing description has been confined to the operation of the device in one direction only as indicated by the arrows 10 and 11. If the operation is reversed it will be apparent at once that chamber 15 becomes the compression chamber, chamber 14 the suction chamber and that the valve mechanism in chamber 14 will be in operation. The flow of liquid will then be upward through the port 17 and in order that it shall be entirely unconstricted the valve 19 is preferably mounted loose on the bolt and free to lift from the head on which it rests. For the reverse movement a valve mechanism in chamber 15 adapted to close port 18 is necessary. This second valve mechanism may or may not be identically the same in size and adjustment as that already described, so, for the purpose of distinction I have designated the several parts by the same numerals with a suffix small letter "a." In an application of the device to railway motor cars that should be run preferably always in one direction the valve brought into operation when backing up may be adjusted for a lower maximum speed. In an application of the device to machines or motors built to run in one direction only, the gears running as indicated, the lower chamber 16 and the port 18 may be merged into and made a part of the suction chamber 15, and the valve 19$^a$ with its supporting mechanism will be eliminated.

While the construction as illustrated requires separate and independent valves for forward and backward control, yet it will be apparent to a mechanic or hydraulic engineer that, with an arrangement of common check valves, one automatic valve of the character described may be placed in a passage between the two sides of the pump so as to be effective for operation in either direction.

Since the speed controlling device is connected up to run continuously with the machine on which it is mounted all wearing parts must be well lubricated. In furtherance of this object the bearing, 29, for the shaft 7 of the primary gear is provided with the usual spiral oil grooves 30, and a lubricating oil is used in the pump for the liquid medium. A certain amount of oil will leak out around the bearing, especially after a hydraulic pressure has been established on the compression side of the gears. The best operation of the device will be had when the compression and suction chambers and the interdental spaces are nearly full of oil, and there also will be a tendency for the high level portion of the liquid to leak out around the bearing when the machine is standing still. It is necessary therefore to provide means for saving the leakage and returning it to the pump circuit. To this purpose I provide a circular oil groove, 31, near the outer end of the bearing leading through an opening 32 into a reservoir chamber 33. From the bottom of this reservoir a passage 34 leads to a passing interdental space of the secondary gear. Particular attention is called to the fact that the reservoir is connected with the pump circuit proper only at an interdental space remote from either the compression or suction sides and that the liquid therein is not subject to the regular pumping action. This construction is of especial importance in a gear pump that is subject to a reversal of operation. Only when an interdental space that is passing the end of the passage 34 is only partly filled and contains a partial vacuum will liquid flow into it from the reservoir. This condition will occur when the level of liquid in the suction chamber falls below the level of the opening into the gear recess, as at space 13, so that the interdental spaces pass without being filled with oil. With this provision for returning the leakage the liquid contents will not need replenishing except at long intervals, and then the old oil should be drawn off to remove any possible wearing grit and the chambers filled with a new, clean lubricant.

It is obvious that many changes may be made in the form and details of construction of my automatic maximum-speed controller without changing the fundamental principles of its construction and operation. The throttling of the discharge side of the pump by automatic means governed by the speed of operation is a fundamental principle, and while the means I have employed in this embodiment of the invention is based on the transformation of the applied forces into a rise in hydraulic pressure, yet it will be recognized at once by an engineer or mechanic that other forms of transformation governed by the speed might be used, such for instance as that of centrifugal force.

Having thus described my invention, what I claim as new and desire to secure by Letters Patent is—

1. An automatic maximum speed controller comprising a part adapted to be driven by the mechanism to which the controller is applied, a pump connected to said part, compression and suction chambers connected together and to said pump for passage of fluid through said chambers and said pump, a valve arranged between said compression and suction chambers, and means for holding said valve open under normal flow of fluid between said chambers while permitting the valve to close under excessive flow of fluid.

2. An automatic maximum speed controller comprising a casing, a part extending outside said casing and adapted to be driven by the mechanism to which the controller is applied, a pump within said casing and connected to said driven part, compression and suction chambers within said casing, ports connecting said chambers, and a spring retained valve adapted to be actuated by the flow of fluid to partially close said port when the restriction in the flow of fluid therethrough shall have raised the pressure in the compression chamber to a predetermined amount.

3. An automatic maximum speed controller comprising a part adapted to be driven by the mechanism to which the controller is applied, a pump connected to said part, compression and suction chambers connected together and to said pump for passage of fluid through said chambers and said pump, a valve arranged between said compression and suction chambers, a spring for holding said valve open under normal flow of fluid between said chambers while permitting the valve to close under excessive flow of fluid, and means for adjusting said spring.

4. An automatic maximum speed controller comprising a part adapted to be driven by the mechanism to which the controller is applied, a pump connected to said part, compression and suction chambers connected together and to said pump for passage of fluid through said chambers and said pump, a valve arranged between said compression and suction chambers, means for holding said valve under normal flow of fluid between said chambers while permitting the valve to close under excessive flow of fluid, and means whereby the extent to which the valve shall close may be varied.

5. An automatic maximum speed controller comprising a gear pump mechanism to be connected to and driven synchronously by or with a motor vehicle or other machine, having inclosed intermeshing pump gears, compression and suction chambers closed to the exterior and connected by a port, a liquid in the interdental spaces of the gears and in the chambers having a constricted flow through said port, and a spring retained valve adapted to be actuated automatically to partially close the port when the constriction in the flow of liquid therethrough shall have raised the hydraulic pressure in the compression chamber to a predetermined amount.

6. An automatic maximum speed controller comprising a gear pump mechanism to be connected to and driven synchronously by or with a motor vehicle or other machine, having inclosed intermeshing pump gears, an interior passage connecting the discharge and suction sides thereof, a liquid in the interdental spaces and in the passage, and a spring retained valve adapted to be actuated automatically to partially close or throttle the said connecting passage when the flow of liquid therethrough shall have reached a predetermined velocity.

7. An automatic maximum speed controlling device comprising in combination a liquid gear pump mechanism to be connected to and operated synchronously by or with a motor vehicle or other machine, a supply of liquid for the suction side of said pump, and means for throttling the discharge side thereof adapted to be actuated automatically after the speed of operation of the pump has exceeded a predetermined rate.

8. An automatic maximum speed controlling device comprising in combination a fluid tight pump mechanism to be connected to and operated synchronously by or with a motor vehicle or other machine, a valve for the discharge side of said pump, and means to be actuated automatically to partially close said valve so as to greatly increase the power necessary to drive the combined mechanism after its speed shall have become greater than a predetermined rate.

9. An automatic maximum speed controlling device for a power driven vehicle comprising a gear pump adapted to be driven synchronously with said vehicle by the same motive power, and a valve for throttling the discharge of said pump adapted to be actuated by said motive power after the speed of operation has passed a predetermined rate.

10. A maximum speed controlling device for a railway motor car comprising a gear pump connected to and adapted to be operated synchronously with said motor car when running either forward or backward, a throttling valve for the discharge passage of said pump, and means for automatically actuating said valve when the speed of operation shall have passed a predetermined rate.

11. An automatic maximum speed controlling device comprising in combination a liquid gear pump mechanism to be connected to and operated synchronously by or with a motor vehicle or other machine, and a spring retained valve mechanism adapted to be actuated automatically to partially close or throttle the discharge passage of said pump when the velocity of the liquid flowing through said valve shall have become greater than a predetermined rate.

12. An automatic maximum speed controlling device comprising in combination a liquid gear pump mechanism to be connected to and operated synchronously by or with a motor vehicle or other machine, and a spring retained valve mechanism adapted to be actuated automatically to partially close or throttle the discharge passage of said pump when the velocity of the liquid flowing through said valve shall have become greater than a predetermined rate, the said valve mechanism being removable and interchangeable.

13. A gear pump mechanism comprising a casing, a shaft mounted within said casing and extending outside thereof, a pump connected to said shaft, said casing having a pump chamber and compression and suction chambers connected together and to said pump chamber, means for delivering liquid to the bearing of said shaft, a reservoir adapted to receive the leakage of liquid from said bearing, and suitable connection between said leakage reservoir and said pump chamber.

14. A reversible gear pump mechanism having closely incased primary and secondary gears, a passage connecting the discharge and suction sides thereof, a liquid in the passage and the interdental spaces of the gears, valve means for limiting and controlling the flow of liquid through said passage, a reservoir adapted to receive the leakage of liquid from around the driving shaft of the primary gear, and an opening from said reservoir into a passing interdental space of one of the gears at a point remote from the discharge or suction sides thereof.

15. An automatic maximum speed controller for motor vehicles and the like, comprising a liquid pump and a casing therefor having a pump chamber and a closed circuit through which liquid is circulated by said pump, a pump actuating shaft, said casing having a bearing through which said shaft extends, means for throttling the flow of the circulating body of liquid when the speed of operation of the pump exceeds a predetermined rate, and a passage from said shaft bearing to said pump chamber for restoring the liquid leaking into said bearing to the body of circulating liquid.

WILLIAM S. WESTON.